Patented Dec. 5, 1950

2,533,138

UNITED STATES PATENT OFFICE 2,533,138

PURIFICATION OF HYDROGEN

Amos S. Newton, Ames, Iowa, assignor to the United States of America as represented by the United States Atomic Energy Commission No Drawing. Application May 18, 1945,
Serial No. 594,587

3 Claims. (Cl. 23—210)

This invention relates to the purification of hydrogen. More particularly it relates to a process of purifying hydrogen to an extraordinarily high degree of purity.

In the past a number of different methods of purifying hydrogen have been employed to remove small amounts of impurities. For example, hydrogen has been purified by passing it over hot copper or platinized asbestos and then over a drying agent such as calcium chloride or phosphorous pentoxide. The effect of this process is to convert the oxygen present to water which is then removed by the drying agent. Another method of purifying hydrogen by removing the oxygen therefrom, consists of passing the gas through alkaline pyrogallol which is an absorbent for oxygen followed by dehydration with a drying agent such as calcium chloride or phosphorous pentoxide. These processes remove substantially all of the oxygen but do not remove other impurities such as carbon monoxide and hydrocarbons which are commonly associated with hydrogen produced by cracking hydrocarbons.

It is an object of the present invention to provide a method of purifying hydrogen to an extremely high degree.

It is a further object of this invention to provide a method of purifying hydrogen from all impurities commonly present in hydrogen except inert gases, such as argon, neon, etc.

It has been found in accordance with the present invention, that when hydrogen, admixed with various gaseous impurities, is passed over a large surface of uranium metal at a temperature above the decomposition temperature of uranium hydride and at a temperature below the decomposition temperature of the compounds formed by combination of the uranium with impurities in the hydrogen, the impurities are removed therefrom to an extraordinarily high degree. In fact, it has been found that when hydrogen is passed over a large surface of uranium at a temperature above the decomposition temperature of uranium hydride (about 435° C. at atmospheric pressure), all the impurities including carbon oxides, oxides of nitrogen, nitrogen, oxygen, chlorine and the like, except the inert gases are substantially completely removed. Thus, if hydrogen is passed over a large uranium surface at a temperature between about 700° and 800° C., all ordinary impurities are completely removed.

The uranium used may be in the form of turnings or preferably in the form of powder made by first converting the uranium to the hydride at from 225° C. to 435° C., and then decomposing the uranium hydride by heating it to above about 435° C. This process is described in detail in copending application by James C. Warf, Serial No. 595,181, filed May 22, 1945.

The present invention may be more specifically illustrated by the example which follows:

Example

A silica tube about 12 inches long is filled with 100 grams of uranium turnings cut up in fine pieces. The tube is placed in an electric furnace and gradually heated. Commercial electrolytic hydrogen from a tank is passed in one end of the tube and out the other. Heat resistant glass wool plugs are placed at either end of the tube to prevent uranium hydride powder from being blown out of the tube. While passing in hydrogen, the tube is gradually heated to between about 225° C. and 235° C. At this temperature, the uranium is converted to the hydride in the presence of hydrogen. As the heating continues and the temperature increased to around 350° C. to 400° C., the uranium hydride is decomposed giving off the hydrogen and converting the uranium to a fine powder having a very large surface. The uranium powder so formed is heated at about 700° C. to 800° C. Hydrogen containing impurities such as those listed above passed through the tube at this temperature comes out with no detectable impurities.

The impurities removed from commercial hydrogen are primarily oxygen, water, nitrogen, together with hydrocarbon oils and carbon monoxide which may be present. One hundred grams of uranium turnings when used in the apparatus described will generally purify 200 cubic feet of commercial electrolytic hydrogen. However, the actual volume of uranium used is rather small in view of the high density of the metal. Varying quantities of gas may be purified depending on the amount of impurities present.

The process of the present invention offers a simple and efficient means for continuously purifying hydrogen to extremely high purity. All detectable impurities, with the exception of rare gases, are removed. However, for most chemical and commercial work even of high accuracy, the presence of inert rare gases, such as argon and neon is immaterial.

If it is desired to remove the rare gases from hydrogen, this object can be accomplished by another process that comprises separating the hydrogen from such a hydrogen-containing mixture by first contacting said mixture with finely divided uranium at a temperature of about 200–250° C. to produce uranium hydride and thereafter decomposing the latter at a temperature of about 435° C. to obtain substantially pure hydrogen.

It will be apparent to those skilled in the art to which the present invention relates that it is susceptible of numerous modifications and changes without departing from the scope thereof. For example, other metals such as thorium, cerium, and the like, whose hydrides are less thermostable than the compounds formed by reacting said metals with the impurities commonly associated with hydrogen, may be employed in the process of the present invention in place of uranium. In general, it may be said that such modifications or changes are to be considered as lying within the scope of the present invention.

What is claimed is:

1. A process for the separation of hydrogen from gaseous mixtures containing hydrogen, hydrocarbons, oxygen, nitrogen, moisture and carbon monoxide which comprises contacting said gaseous mixture with a uranium surface at a temperature of 700 to 800° C.

2. A process for the separation of hydrogen from gaseous mixtures containing hydrogen, hydrocarbons, oxygen, nitrogen, moisture and carbon monoxide which comprises contacting said gaseous mixture with finely divided uranium at a temperature of 700 to 800° C.

3. A process for the separation of hydrogen from gaseous mixtures containing hydrogen and hydrocarbons which comprises contacting said gaseous mixture with finely divided uranium at a temperature of 700 to 800° C.

AMOS S. NEWTON.

REFERENCES CITED

The following references are of record in the file of this patent:

FOREIGN PATENTS

| Number | Country | Date |
|--------|---------|------|
| 166,541 | Great Britain | Oct. 13, 1922 |